(12) United States Patent
Kim et al.

(10) Patent No.: US 9,566,521 B2
(45) Date of Patent: Feb. 14, 2017

(54) METHOD AND DEVICE FOR MANAGING CHARACTER INFORMATION OF SPORTS GAME

(75) Inventors: Jeong Hun Kim, Seoul (KR); Sun Hwa Choi, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 121 days.

(21) Appl. No.: 14/344,014

(22) PCT Filed: Oct. 6, 2011

(86) PCT No.: PCT/KR2011/007407
§ 371 (c)(1),
(2), (4) Date: Mar. 10, 2014

(87) PCT Pub. No.: WO2013/035925
PCT Pub. Date: Mar. 14, 2013

(65) Prior Publication Data
US 2014/0235346 A1    Aug. 21, 2014

(30) Foreign Application Priority Data
Sep. 8, 2011 (KR) .................. 10-2011-0091212

(51) Int. Cl.
*A63F 9/24* (2006.01)
*A63F 13/65* (2014.01)
(Continued)

(52) U.S. Cl.
CPC .............. *A63F 13/65* (2014.09); *A63F 13/12* (2013.01); *A63F 13/828* (2014.09); *A63F 2300/69* (2013.01); *A63F 2300/8052* (2013.01)

(58) Field of Classification Search
CPC .... A63F 13/12; A63F 13/828; A63F 2300/69; A63F 13/65
See application file for complete search history.

(56) References Cited

U.S. PATENT DOCUMENTS 8,905,849 B1 * 12/2014 Coppersmith, III .... A63F 13/65
463/1
2004/0067788 A1 * 4/2004 Angelopoulos ......... A63F 13/10
463/1
(Continued)

FOREIGN PATENT DOCUMENTS

JP    2001-347074 A    12/2001
JP    2002-102543 A    4/2002
(Continued)

*Primary Examiner* — Steve Rowland

(57) ABSTRACT

Provided is a managing technology of an on-line game which increases a usability of users and diversifies the service. An exemplary embodiment of the present invention provides a sports game character information managing method, including: receiving event information on at least one of a team and a player included in an on-line game from at least one of an organization and a medium related with a sports game corresponding to the on-line game; selecting at least one of players related with the event information; selecting a game character which matches identification information of the selected player; setting an improved capability point which is added to a capability point of the selected game character in accordance with the event information; and adding the improved capability point to the capability point of the game character which is stored in a game server.

18 Claims, 14 Drawing Sheets

(51) Int. Cl.
     *A63F 13/828*     (2014.01)
     *A63F 13/30*      (2014.01)

(56) References Cited

U.S. PATENT DOCUMENTS

| | | | |
|---|---|---|---|
| 2007/0026946 A1* | 2/2007 | Newborn | A63F 13/12 463/42 |
| 2008/0161113 A1* | 7/2008 | Hansen | A63F 13/12 463/42 |
| 2009/0075731 A1* | 3/2009 | Kamiya | A63F 13/10 463/29 |
| 2010/0099472 A1* | 4/2010 | Harris | A63F 13/10 463/2 |

FOREIGN PATENT DOCUMENTS

| | | |
|---|---|---|
| JP | 2002-320775 A | 11/2002 |
| JP | 2005-312624 A | 11/2005 |
| KR | 2001-0045997 A | 6/2001 |
| KR | 2010-0087766 A | 8/2010 |

\* cited by examiner

FIG. 9

| Type of event | Duration time | Improved capability point | Order of priority |
|---|---|---|---|
| FIFA ballond'or | Three months | Entire capability point+10 | 1 |
| Best 11 of the year selected by FIFA | Three months | Entire capability point+7 | 2 |
| FIFA world cup champion country | Three months | Entire capability point+7 | 3 |
| Golden shoe of FIFA world cup | Three months | Entire capability point+7 | 4 |
| EPL best scorer | One month | Entire capability point+5 | 5 |
| EPL champion team | One month | Entire capability point+3 | 6 |
| ⋮ | ⋮ | ⋮ | ⋮ |
| EPL weekly best 11 | one week | Entire capability point+3 | N |

METHOD AND DEVICE FOR MANAGING CHARACTER INFORMATION OF SPORTS GAME

CROSS REFERENCE TO RELATED APPLICATIONS

This application is a 35 U.S.C. §371 National Phase Entry Application from PCT/KR2011/007407, filed Oct. 6, 2011, and designating the United States, which claims priority under 35 U.S.C. §119 to Korean Patent Application No. 10-2011-0091212 filed Sep. 8, 2011, which is incorporated herein in its entirety.

TECHNICAL FIELD

A technology which applies an additional effect to information of a game character including a capability point in a sports game having a characteristic in that a game character matches an actual character in an on-line game is provided. More specifically, a technology which applies an additional effect so as to reflect a result of an actual sports game onto a game character to attract an interest of a game user is provided.

BACKGROUND ART

An on-line game is a field which becomes more popular in an on-line cultural industry in recent years by the development of a network and computer technology. Users access a game server using terminals of the users and select a specific character to manipulate the character on-line and enjoy the game.

Types of on-line games are diversified due to the development of game contents and development of a network technology. Particularly, an on-line game for a field in which users may encounter in real life becomes very popular because the user may feel as if the user directly manipulates the user's favorite real life to enjoy the game.

An example of a field where the user may encounter in real life is an on-line sports game. Popular sports such as baseball, basketball, or soccer are licensed with an international organization of each sport and a game in which sport star players who actually play the game are characterized is serviced so that the users may enjoy the on-line sports game because the users may directly manipulate the user's favorite sport star player on the game.

For example, in the case of a soccer game, the users select a foreign famous soccer player and a team and become a director of the soccer team to execute the game so that fantasy of the user for the sport is satisfied, which the game has become very popular. In the position of a game service provider, users may frequently use the game in order to obtain game characters corresponding to popular star players and thus payment for an additional service such as an item or a character card may be increased so that profitability is high.

Due to the characteristic of the sports game, as mentioned above, an actual sport star player is used as a game character, so that most users may enjoy the game while comparing the sports game on the game with the actual sports game. Accordingly, in the sports game, the users may have a habit of comparing a performance of the players in the actual sports game with a characteristic of the players on an on-line sports game, which needs to be applied to the game.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a method and a device for managing character information of sports game.

Therefore, the present invention has been made in an effort to apply an event which happens to a player in an actual sports game to information of a game character corresponding to a sport player which is manipulated by a user in an on-line sports game, thereby increasing interest of a user of the on-line sports game in the sports game.

Technical Solution

An exemplary embodiment of the present invention provides a sports game character information managing method, including: receiving event information on at least one of a team and a player included in an on-line game from at least one of an organization and a medium related with a sports game corresponding to the on-line game; selecting at least one of players related with the event information; selecting a game character which matches identification information of the selected player; setting an improved capability point which is added to a capability point of the selected game character in accordance with the event information; and adding the improved capability point to the capability point of the game character which is stored in a game server.

The setting of an improved capability point may include setting an application time of the improved capability point to be different depending on a type of event information.

The setting of an improved capability point may include setting the improved capability point such that an improved capability point which is added when the event information regards an individual player is larger than an improved capability point which is added when the event information regards a team of the player.

The event information may include, when a game of a national team is played for the sports game by which the on-line game is played, at least one of the result of the game and information indicating what happens to players of the national team in the game.

The adding of the improved capability point may include, when the improved capability point which is applied to a specific player exceeds one, adding only one improved capability point having a higher order of priority which is set based on at least one of the application time of the improved capability point and an improved amount of the improved capability point.

The method may further include after the adding of the improved capability point, displaying a message indicating that the improved capability point is assigned to the game character on an on-line game screen.

The displaying of a message may include outputting information indicating that when the user accesses the on-line game, an effect that the improved capability point is assigned to the game character starts to be applied for a predetermined period from a time when the improved capability point is assigned.

The displaying of a message may include displaying the game character to which the improved capability point is assigned to be distinguished from another game character on a screen through which a plurality of game characters is displayed.

Another exemplary embodiment of the present invention provides a sports game character information managing device, including: an event information collecting unit which receives event information on at least one of a team and a player included in an on-line game from at least one of an organization and a medium related with a sports game corresponding to the on-line game; a character selecting unit which selects a game character which matches identification information of a player related with the event information; an additional effect selecting unit which sets an improved capability point which is added to a capability point of the selected game character in accordance with the event information; and an additional effect applying unit which adds the improved capability point to the capability point of the game character which is stored in a game server.

The device may further include an additional effect application control unit which, when the improved capability point which is applied to a specific player exceeds one, controls to add only an improved capability point having a higher order of priority based on at least one of the application time of the improved capability point and an improved amount of the improved capability point.

The additional effect selecting unit may select the improved capability point such that an improved capability point which is added when the event information regards an individual player is larger than an improved capability point which is added when the event information regards a team of the player.

The additional effect selecting unit may select an improved capability point having different application times depending on the type of event information.

Another exemplary embodiment of the present invention provides a sports game character information managing system, including: a sports game character information managing device which transmits a signal which receives event information on at least one of a team and a player included in an on-line game from at least one of an organization and a medium related with a sports game corresponding to the on-line game, selects a game character which matches identification information of a player related with the event information, and then adds an improved capability point selected in accordance with the event information to a capability point of the selected game character; and a game server which receives the signal transmitted from the sports game character information managing device to add the improved capability point to the stored capability point of the game character.

The sports game character information managing device, when the improved capability point which is applied to a specific player exceeds one, may control to add only an improved capability point having a higher order of priority based on at least one of the application time of the improved capability point and an improved amount of the improved capability point.

The sports game character information managing device may select the improved capability point such that an improved capability point which is added when the event information regards an individual player is larger than an improved capability point which is added when the event information regards a team of the player.

The game server, when a user accesses the on-line game, may output information indicating that the improved capability point starts to be added to a capability point of the game character on an access screen of the on-line game for a predetermined period from a time when the improved capability point is added.

The game server may display the game character to which the improved capability point is assigned to be distinguished from another game character on a screen through which a plurality of game characters is displayed among on-line game playing screens.

Advantageous Effects

According to an embodiment of the present invention, the users play the game while checking that the records of the sports players by which the users play are reflected in the game, so that the users may feel as if the users supervise the actual soccer players in the game which the users access and play the game. Therefore, the user may be interested not only in the sports game but also in the actual sports so that the user may be immersed in the sports game to increase the utilization rate of the game. Further, a value of the player in the on-line game is flexibly changed by the additional effect so that the game is more fun.

DESCRIPTION OF THE DRAWINGS

FIG. 9 illustrates an example of an improved capability point table in order to implement an exemplary embodiment of the present invention.

MODE FOR INVENTION

Figure 1:
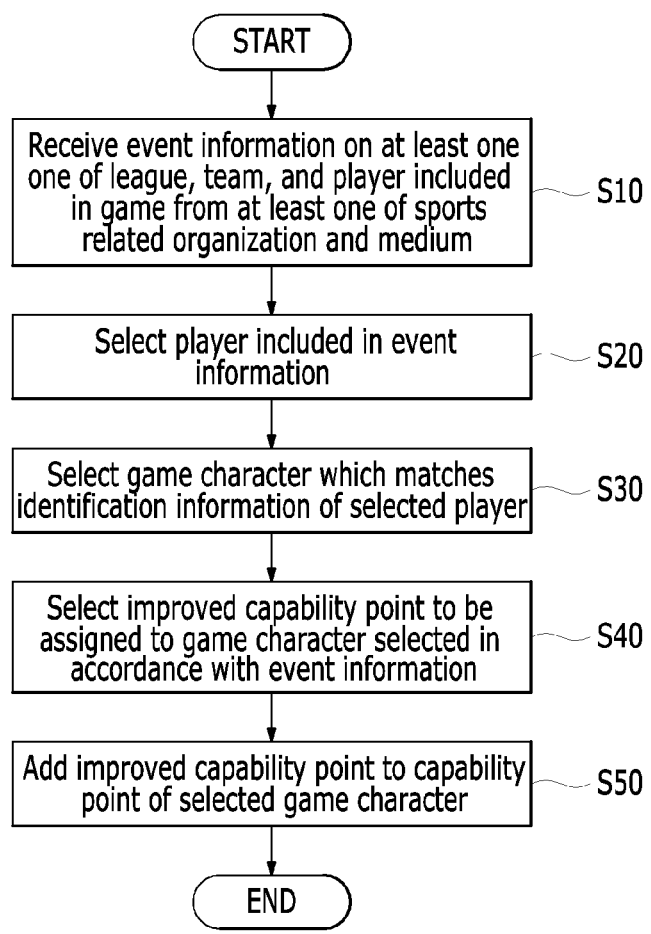
FIG. 1 is a flowchart of a character information managing method of a sports game according to an exemplary embodiment of the present invention.

Hereinafter, character information managing method and device of a sports game according to an exemplary embodiment of the present invention will be described with reference to accompanying drawings.

In the following description, in order to clearly understand the present invention, description of a known technology regarding a characteristic of the present invention will be omitted. It is obvious that the following exemplary embodiment is a detailed description which is provided for more understanding of the present invention but does not limit the scope of the present invention. Therefore, an equivalent invention which performs the same function as the present invention may be also covered by the scope of the present invention.

In the following description, like reference numerals designate like elements having the same configuration and redundant description and description of a known technology will be omitted.

In an exemplary embodiment of the present invention, "communication", "communication network" and "network" may be used to have the same meaning. The three terminologies indicate a wired or wireless local area and wide area data transmitting/receiving network through which a file is transmitted/received between a user terminal, another user terminal, and a download server.

In the following description, "game server" indicates a server computer to which a user access to use game contents. In the case of a game which has a small capacity or a small number of users, a plurality of game programs may be operated by one game server. Further, in the case of a game which has a large capacity or a large number of real time accessing members, one or more game servers which operate one game may be provided depending on a function of the game.

In addition, middle ware for database or servers which perform payment processing may be connected to the game server, but the description thereof will be omitted in the present invention.

In the present invention, game characters indicate all characters which appear in the game through which users experience one of sports among on-line games. The game character appears on a game screen and shows a predetermined action in accordance with the manipulation of the user. Further, the game character increases a level by accumulating a predetermined experience point in accordance with a result of playing the game and when the level is increased, a capability point of the character becomes stronger.

In the present invention, sports indicate general sports and all kinds of sports which may be played as an on-line game. For example, the sports include soccer, baseball, basketball, tennis, volleyball, track game, or martial arts.

The capability point of the character indicates information having a predetermined number which is included in the information of the character. The character information includes a plurality of numbers which represents a capability point of the character and each number is used as an indicator representing the characteristic and a strength/weakness of the character in the game.

For example, in an on-line soccer game, positions of the characters vary depending on the capability point of the character. That is, positions are set such that a character having a high capability point in attacking is a striker, a character having a high capability point in passing and dribbling is a midfielder, a character having a high capability point in defense is a defender, and a character having a high capability in goal keeping is a goal keeper. In other words, it means that characters have different capability points in accordance with the positions. Further, it is obvious that a better player may have a higher absolute value of the capability point than that of other players.

For example, in a game such as soccer among the sports games, the game characters may be characters describing players which appear in the soccer game to play the soccer game. Players which play the soccer game in the present invention mean foreign and domestic soccer players who appear in the actual soccer game.

In order to use nationality and a name of a professional league of the sport player together with an appearance and a name of the foreign and domestic player which appear in the actual sport game, license contract needs to be signed between international management organizations, national management organizations, and professional league management organizations and a service provider of the sports game.

Further, in the present invention, each game character may have at least one sub character and identification information of the game character which means a base ID representing the sub character and the information of each character is managed in the game server.

The sub character means a plurality of characters corresponding to one player. The plurality of characters may be characters corresponding to a season and league through which one player plays or a character which is released to celebrate an international competition (for example, Olympic or world cup) through which one player plays.

For example, when one soccer player plays a plurality of seasons and gets a predetermined result (for example, a team of the player advanced to a qualifying round in the World cup), the character corresponding to the soccer player may include a commemorative character which commemorates one season or a World cup commemorative character in addition to a character which is basically used by the user.

The above-mentioned sub characters indicate one player, so that the sub characters may be grouped by a base ID (Base_ID) which is identification information of the player to be managed. Accordingly, in order to access the sub characters in the game server, the user may access the character group of the player through the base ID for the player and then access the information of the sub character through the ID of the sub character.

Further, in order to display the game characters on a game screen or play the game, a plurality of information may be included in order to differentiate a performance of each character. Representatively, image information of the game character may be included in order to allow the user to check the character through a preparation screen of the game or a game playing screen.

For example, in the case of a soccer game, the information of the game character may include two-dimensional or three-dimensional overall player image information representing physical feature of the player who wears a predetermined soccer uniform and image information describing a face of each player. Further, the information of the game character may include information which is required to play the game by a game character corresponding to the player, for example, information regarding name, physical information, nationality information, and position.

In the meantime, the capability point of the character in the present invention indicates numerical information which differentiates the performance of the character when the game is played, among the plurality of above-mentioned information. That is, even in the real sport game, the capability of the player is evaluated according to the ability and actually, various sports media sources give scores in accordance with the game result of the players and numerically represent the capability of the players in the game.

Therefore, information on the capability of the game character corresponding to the player in the sports on-line game is numerically represented to be stored as the information of the game character in order to differentiate the performances of the characters when the game is played.

For example, in the case of a soccer game, information of the game character corresponding to the player may include numerical values for a plurality of capabilities which may be actually applied to the soccer game and represent a performance capability of the character in the soccer game, such as an offense capability, a defense capability, a passing capability, a dribbling capability, or a goal keeping capability. In the case of a baseball game, information of a game character may include an offense capability, a defense capability, or a base running capability.

In the present invention, the character of the sport game corresponds to an actual sport player so that the capability point included in the information of the game character may be set to be different depending on the game history and evaluation of the actual sport player. The capability points of the characters in the present invention reflect the capabilities of the actual sport players and mean numerical information which determines a performance capability of the characters representing the players in the game.

Further, the improved capability point added in the present invention is added based on the above-mentioned base ID. That is, when the improved capability point is added to one game character, the additional effect is applied to all sub characters which are included in the game character.

FIG. 1 is a flowchart of a character information managing method of a sports game according to an exemplary embodiment of the present invention.

Referring to FIG. 1, a character information managing method of a sports game according to an exemplary embodiment of the present invention includes step S10 of receiving event information on at least one of a team and a player which are included in an on-line game, from at least one of an organization and a medium related with a game of sports corresponding to the on-line game.

In step S10, the organization and the medium which transmit event information indicate an organization and a medium related with the game of sports. That is, in the case of a soccer on-line game, the organization related with the soccer includes the FIFA (federation internationale de football association) and a national soccer management organization of each country including the Korean national football team as the related organization in step S10. Further, the professional football operating organization of each country such as the Korean professional football league which runs the K League, an organization which operates the English Premier League which is an England professional football league may be included as the related organization.

The media source related with the game of sports indicates mass media organization which creates and transmits a result such as a score for evaluating the players in accordance with the result of the game of sports, particularly in the present invention, while transmitting sports news. Representatively, a media source which sets a score of the player or selects weekly best 11 players based on a weekly game result of the EPL which is the England professional football league may be included in the related media in the present invention.

The event information in the present invention indicates all information indicating what happens to be a specific team or player in each game of sports together with an actual sports game result. For example, in the case of soccer, news that the FIFA Ballond'or which is a best player award is presented by the FIFA, news of players who are selected as best 11 players of the year which are selected by the FIFA, information representing that a national soccer team of a player wins the championship of the World Cup which is a national football competition which is held every four years, award information of Golden Shoe/Golden ball which is given to best players in the World Cup, winning information of the team of the player in the professional league, information on best goal scorers or assists, information representing that a player is selected as the best 11 of the year selected for every league, and information representing that a player is selected as weekly best 11 of the league selected by various media sources may be included in the event information.

That is, the event information indicates scores and award information of the team or the player which are selected by the organization and the medium which have source credibility in order to generate an additional effect. As mentioned above, the event information includes information on the team such as information of champion team and information on individual players such as a best player in the league and information on selection of best 11.

That is, in step S10, event information including information on a record for the team or the player selected by the related organization and medium is received periodically or in real time.

For example, step S10 may be performed whenever at least one of the related organization and medium announces a best player or a player of the year, a league champion team, a winner team of the national competition, a best scorer of the league, or a weekly best player list.

Further, in order to increase the availability of the game by users from various countries, game results of national teams of the countries of the user need to be separately reflected in addition to the above-mentioned event information. Accordingly, the event information may include information on the result of the game of the national team of the game of sports of the country where the on-line game is played and the description thereof will be made in detail with reference to FIG. 4.

When the event information is received by step S10, step S20 of selecting at least one player related with the event information is performed.

The event information includes a type of event information and a plurality of players related with the event information. For example, as mentioned above, if there is event information that announces a player of the year selected by the FIFA, the type of event information is the player of the year selected by the FIFA and the player related with the event information may be a player who is selected as the player of the year.

Further, in the case of the event information on the World Cup champion team, the type of event information is the selection of the World Cup champion tem and the player related with the event information may be all players on the World Cup champion team.

That is, if the event information is information on an individual player, the player related with the event information may be the individual player and if the event information is information on the team, the player related with the event information may be all players on the team. Accordingly, in step S20, an individual player or all players on the team related with the event information may be selected.

After performing step S20, step S30 of selecting a game character which matches the identification information of the selected player is performed. The identification information of the selected player indicates a base ID (Base_ID) of the game characters which are stored in the game server as mentioned above.

As mentioned above, one or more game characters may be provided for one player. One or more game characters for one player are classified into sub characters for data classification and the one player is represented with the base ID to be stored. That is, the base ID is utilized as identification information indicating one player and the sub characters indicate characters of different versions of the one player.

In step S30, all sub characters which match the identification information of the selected player are selected using only the base ID. As mentioned above, in the present invention, the improved capability point is applied based on the base ID of one player and added to characters of all different versions of the one player. Accordingly, the identification information in S30 indicates the base ID.

Next to step S30, step S40 of selecting an improved capability point which is added to at least one selected game character in accordance with the event information is performed.

Various types of event information may be provided depending on the games of sports, as mentioned above. In this case, if the same improved capability point is applied to all the event information, the characteristic of the event information is ignored. Therefore, the improved capability point needs to be differentiated for the event information.

Accordingly, in step S40, different improved capability points are set to be added depending on the type of event information. That is, a criterion in that an improved capability point which is assigned to a player who is awarded a higher level prize is larger than an improved capability point which is assigned to a player who is awarded a lower level prize so as to try to reflect an actual sport game result with a reality to the game.

For example, in soccer, the player of the year selected by the FIFA is a higher level than the best player of the World Cup. Therefore, the improved capability point which is assigned to a player who is selected as a best player of the World Cup is set to be lower than the improved capability point which is assigned to the player who is selected as the player of the year selected by the FIFA.

Similarly, in step S40 of setting the improved capability point, the improved capability point which is assigned when the event information is information on the individual player may be set to be higher than the improved capability point which is assigned to a player on the team when the event information is information on the team.

A characteristic of sports in that an interest of the user and a sports related information medium in the event information which is selected when an individual player plays well is higher than that of event information which may be selected even if the player belongs to a team is considered.

In addition, in step S40, the improved capability point which is assigned to the game character may be diversely selected and the detailed description thereof will be made below with reference to FIGS. 2 to 5.

When the improved capability point is selected, step S50 of adding the improved capability point to the capability value of the game character which is stored in the game server is performed. In the game server, a plurality of game characters is provided for every player and each game character includes data for different capability points in accordance with the version of the character or the player.

In step S50, the user accesses the game server and the game server accesses the plurality of game characters through the base ID of the player and adds the selected improved capability point to the capability point of the game character. Therefore, the user may use a character with a capability point improved by a predetermined amount in accordance with the event information. Accordingly, the user may meet a character to which various events which happen in the actual sports game are reflected while playing a game for the actual sports game so that interest in the game result of the actual sports game is increased and thus the user may be more absorbed in the game.

When the capability point of the game character is improved by performing step S50, the present invention may further perform step (not illustrated) of displaying that the improved capability point is assigned to the game character, on the playing screen of the on-line game.

In this step, for example, information indicating the effect that the improved capability point is assigned to the game character starts to be applied is output on the access screen through which the user accesses the on-line game, that is, a starting screen, for a predetermined period (for example, three days) from the time when the improved capability point is assigned.

Specifically, the user checks an initial access screen in order to access the sports on-line game to use the game. Various notices for using the game may be output on the initial access screen.

In this case, a list of the players whose capability is improved by assigning the improved capability point and the improved capability point which is assigned to the players may send a notice to the user. By doing this, the user may check a record of a specific player and thus how much the capability point is improved so that the user may want to use a character corresponding to the player and check the characters of the players which are used by another user, which helps to play the game.

The users may check the players whose capability point is improved while playing a game, other than the initial access screen. For example, there is a screen on which a plurality of game characters is displayed as a list, among screens when the game is played. An example of the screen includes a screen for managing the team in the sports on-line game, a screen for moving the team, a screen for comparing tactic information in accordance with the sports game, a screen of character cards of the players, and a screen regarding a player transferring market.

When the user checks a character which is represented with a specific mark (for example, golden color) which is distinguished from other characters among the list of the plurality of characters, the user may understand that the player corresponding to the character achieves a record corresponding to predetermined event information so that the capability point is improved.

When a mouse is disposed on a character which is represented with the specific mark on the game playing screen, it is also checked which record is achieved by the character and how much and how long the capability point is improved.

Figure 2:
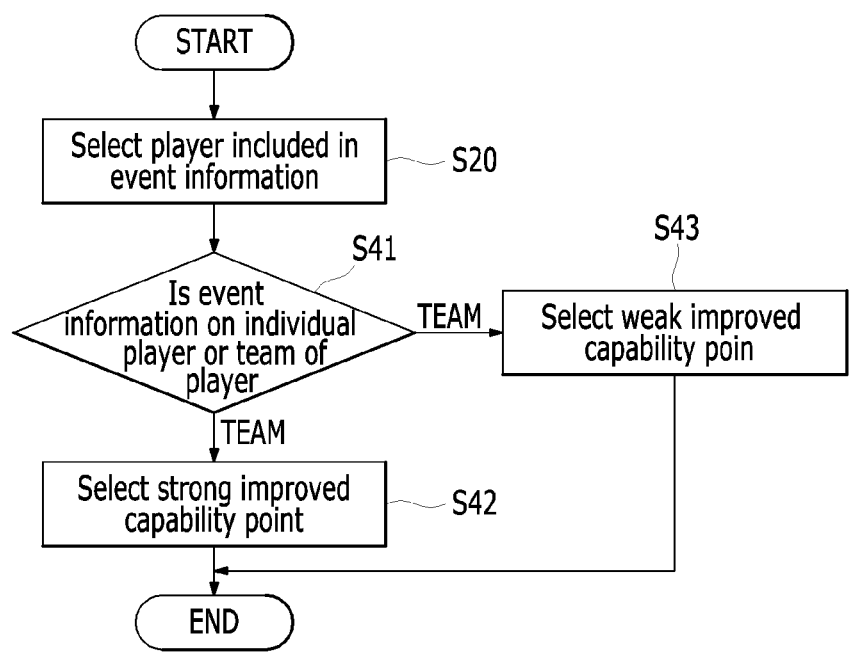
FIG. 2 illustrates a flow of determining an improved capability point to be added according to an exemplary embodiment of the present invention.

FIG. 2 illustrates a flow of determining an improved capability point to be added according to an exemplary embodiment of the present invention. In the following description, a repeated description with the description of FIG. 1 will be omitted.

Referring to FIG. 2, the player which is included in the event information and a game character which matches the identification information of the player are selected in steps S20 and S30 of FIG. 1 and then step of selecting the improved capability point is performed.

In this case, in FIG. 2, a type of event information is analyzed and whether the information regards the individual player or the team of the player, as described above with reference to FIG. 1, is analyzed in step S41. For example, in the case of a soccer game, the event information may be information on a player which is selected as the best scorer of the league or information indicating that the player belongs to the league champion team. In the above example, the former is the event information on the individual player and the latter is the event information on the team of the player.

In this case, as mentioned with reference to FIG. 1, when the event information is information on the individual player, step S42 of selecting a strong improved capability point is performed and when the event information is information on the team, step S43 of selecting a weak improved capability point is performed. Steps S42 and S43 mean a flow of selecting a capability point to be improved from an improved capability point table which will be described in FIG. 9. Further, steps S42 and S43 mean the comparison of the improved value of the relatively improved capability point.

Figure 3:
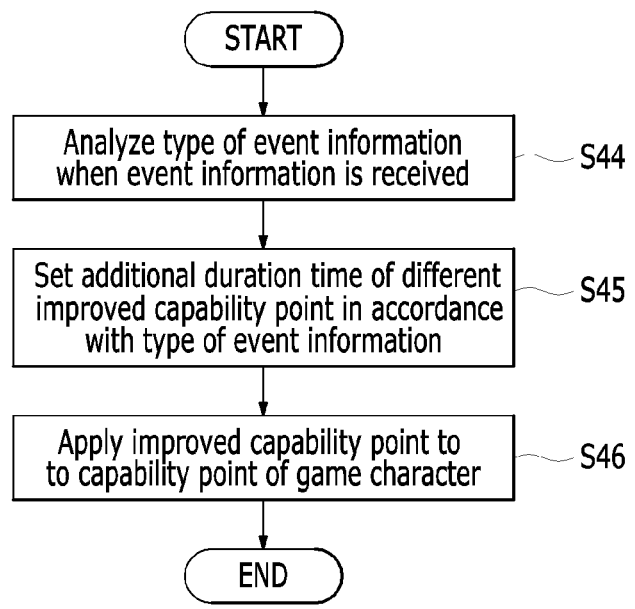
FIG. 3 illustrates a flow of determining an additional duration time of the improved capability point according to an exemplary embodiment of the present invention.

FIG. 3 illustrates a flow of determining an additional duration time of the improved capability point according to an exemplary embodiment of the present invention. In the following description, a repeated description with the description of FIGS. 1 and 2 will be omitted.

Referring to FIG. 3, similarly to FIG. 2, a flow after selecting a player for the event information and selecting a game character in the game server using the identification information of the player is illustrated.

In order to select an improved capability point which is assigned to the game character, first, step S44 of analyzing a type of event information when the event information is received is performed. Next, step S45 of differently setting a duration time of the improved capability point depending on the type of event information is performed.

The duration time of the improved capability point means how long the improved capability point which is assigned to the game character is maintained while being assigned. When a player is included as one of the weekly best players per league, the improved capability point which is assigned to the player needs to be applied for the week only, and thus only when the duration time of the assigned capability point is set, an actual game result is correctly reflected. This is the same as the player of the year selected by the FIFA in the above example. This is because the player is not continuously selected as the player of the year.

Therefore, a duration time for the improved capability point needs to be set and the present invention considers the above-mentioned fact and different duration times for the improved capability point are set depending on the type of event information.

For example, in the case of the player of the year selected by the FIFA or the event regarding reward results related with the World Cup whose updating period is long, a duration time of three months is set and when the best scorer or the champion team is selected per professional league, a duration time of one month is set. Further, in the case of a weekly best player per professional league, a duration time of one week is set by considering the selection period.

When the duration time is set by step S45, the user may use a character whose capability point is improved for a predetermined period through step S46 of applying the improved capability point to data of the game character, that is, the capability point.

Figure 4:
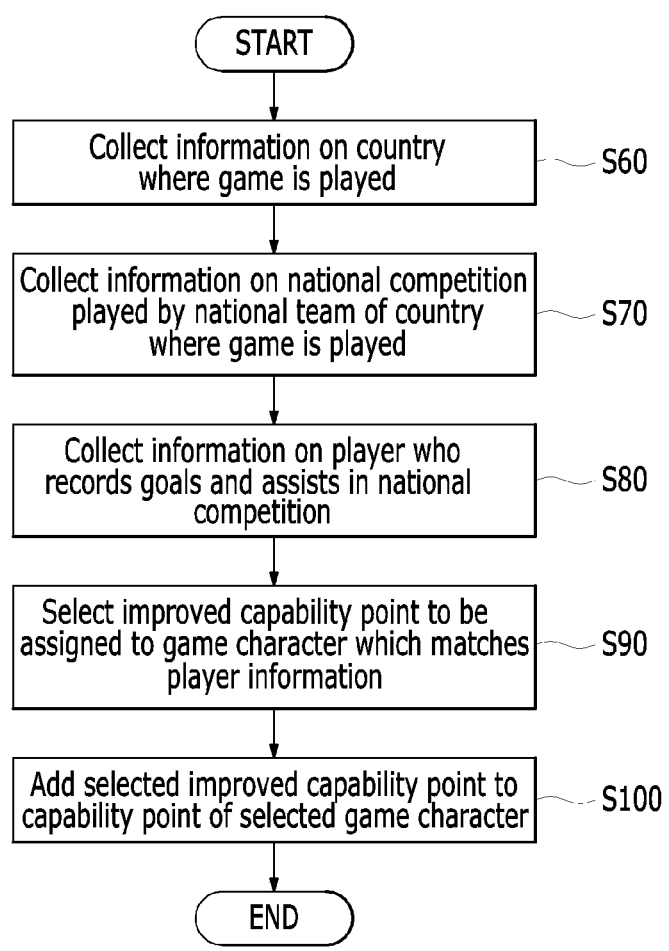
FIG. 4 illustrates a flow of managing character information using a game of the national team according to an exemplary embodiment of the present invention.

FIG. 4 illustrates a flow of managing character information using a game of the national team according to an exemplary embodiment of the present invention.

FIG. 4 illustrates a flow that reflects a game result of a national team of the country of the user as a method for increasing an availability for the game of the users from various countries.

Referring to FIG. 4, first, step S60 of collecting information on a country where the game is played when the event information is collected is performed. In step S60, a country where the game server is installed, an access IP address of each user terminal, and information on a nationality of the user which is input when the user joins a game service are used to collect information on a country where the game is played or the nationality of the user.

Next to step S60, information on national competition which is played by the national team of the country where the game is played is collected in step S70. The collected information on the national competition may be national competition which is acknowledged by the international organization (for example, A match which is acknowledged by the FIFA in the case of soccer) or a friendly match which is held by a sports organization of each country. Further, information on the national competition means a result of the game.

When the information on the national completion is collected in step S70, step S80 of selecting players who mark an important record in the national competition is performed. In step S80, soccer among the sports games is illustrated as an example. That is, players which record a goal or an assist in the soccer national completion are selected. If the sport is a baseball game, players may be selected based on records of hits, homeruns, runs batted in, steals of a runner and strikeouts, earned run average, and lost point information of a pitcher.

When the player is selected, as described in FIG. 1, a game character which matches the identification information of the player is selected and step S90 of selecting an improved capability point to be assigned to the game character is performed. Similarly to the description with reference to FIG. 1, the improved amount of the improved capability point which is selected in accordance with the result of the games of the national competition may be set to be lower than the improved capability point mentioned in the description with reference to FIG. 1.

When step S90 is performed, step of adding the selected improved capability point to the capability point of the game character in the game server is performed and then the user plays the game in accordance with the capability point of the players which changes in real time in accordance with the result of the national team of the country of the user so that the user may enjoy the sport game with fun.

Figure 5:
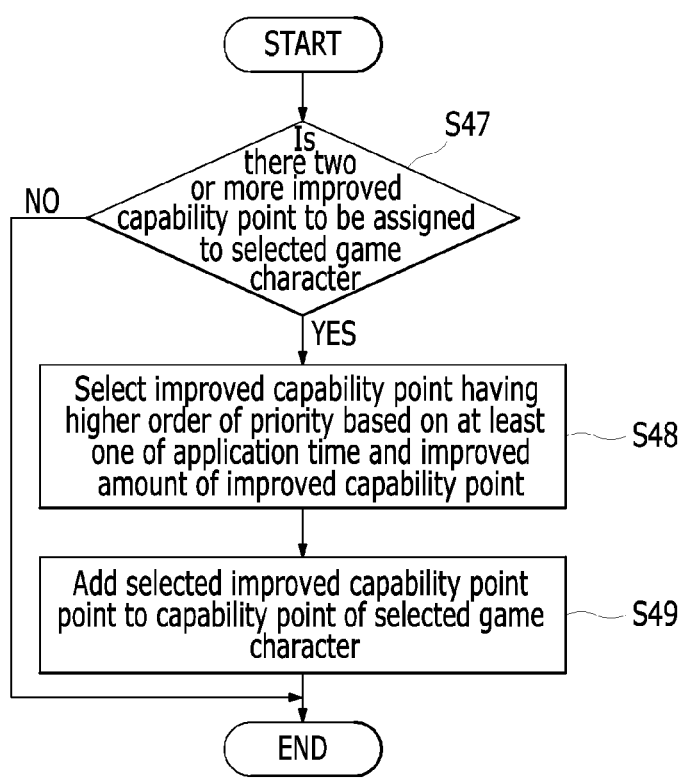
FIG. 5 illustrates a flow when a plurality of improved capability points is provided in order to implement an exemplary embodiment of the present invention.

FIG. 5 illustrates a flow when a plurality of improved capability points is provided in order to implement an exemplary embodiment of the present invention.

In the present invention, one or more event information on one player may be provided. Accordingly, in this case, according to the present invention, several types of improved capability point which is assigned to the game characters for one player may be provided.

In this case, it is not efficient when several types are accumulated to be applied for the purpose of the game, so that the present invention provides a processing thereof.

Referring to FIG. 5, a flow after performing step S30 of FIG. 1 of selecting a game character which matches the identification number of the player and step S40 of selecting an improved capability point which is assigned to the game character is illustrated.

When the improved capability point which is assigned to the game character is selected by step S40, in the present invention, step S47 of determining whether the selected improved capability point which is assigned to the game character exceeds one. Here, whether the improved capability point exceeds one does not determine whether an additional capability point for one or more capability points of the game character but determines whether the type to which improved capability point is assigned is one or more.

If the improved capability point which is assigned in step S47 is one, step S49 of assigning the selected improved capability point to the capability point of the game character is performed. However, if it is determined in step S47 that the improved capability point to be assigned is equal to or larger than two, step S48 of comparing a predetermined additional duration time of a predetermined improved capability point with an improved amount of the improved capability point to set an order of priority of the improved capability point and select only one improved capability point having the highest order of priority is performed.

In FIG. 5, an order of priority of the improved capability point is determined depending on the duration time and the improved amount, as mentioned above. For example, the longer the duration time, the higher the order of priority, and the larger the improved capability point, the higher the order of priority. Step S48 is performed before step S49 to determine an improved capability point to be assigned so that the users may avoid unreasonable application of improved capability point.

Figure 6:
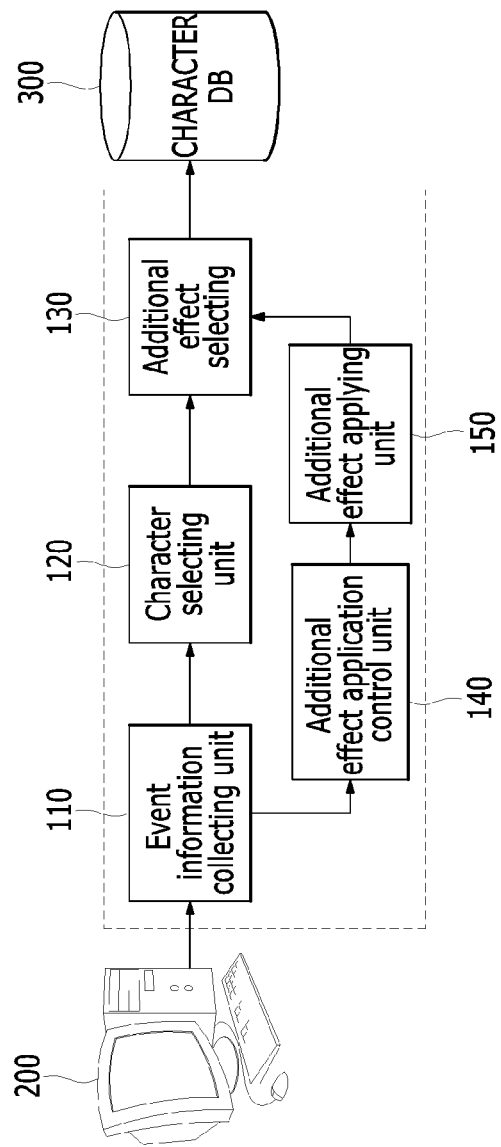
FIG. 6 is a block diagram of a sports game character information managing device according to an exemplary embodiment of the present invention.

FIG. 6 is a block diagram of a sports game character information managing device according to an exemplary embodiment of the present invention. In the following description, a repeated description with the description of FIGS. 1 to 5 will be omitted.

Referring to FIG. 6, a sports game character information managing device 100 according to an exemplary embodiment of the present invention includes an event information collecting unit 110, a character selecting unit 120, an additional effect selecting unit 130, an additional effect application control unit 140, and an additional effect applying unit 150.

The event information collecting unit 110 performs a function of receiving event information on at least one of a team and a player included on a game from at least one of a related organization and a server of a medium of a sports game corresponding to an on-line game, which is represented by a computer 200. That is, the event information collecting unit indicates a component which performs step S10 in FIG. 1.

The character selecting unit 120 is a component which performs steps S20 and S30 of FIG. 1 and performs a function of selecting a player included in the event information and selecting a game character which matches identification information of the player.

The additional effect selecting unit 130 is a component which performs step S40 of FIG. 1 and performs a function of selecting an improved capability point which is added to a capability point of the game character using the event information. Also as mentioned with reference to FIGS. 2 to 5, a function of setting a duration time of an effect that the improved capability point is added is also performed depending on the event information. Further, depending on the event information, steps of FIG. 2 may be performed in order to determine the improved amount to exactly reflect the actual game.

The additional effect application control unit 140 is a component which performs the function illustrated in FIG. 5. That is, when two or more improved capability points are selected for the game characters corresponding to one player, as mentioned above, only one improved capability point having a higher order of priority needs to be applied.

Therefore, the additional effect application control unit 140 determines the number of improved capability points selected for the game characters corresponding to one player and if the number exceeds one, one improved capability point having a higher order of priority, that is, an improved capability point having the highest order of priority is selected in accordance with the order of priority which is stored in advance, and is returned.

The additional effect applying unit 150 receives information on a plurality of game characters (i.e., sub characters) which is selected to match the identification information of the player from the character selecting unit 120 and information on one improved capability point selected from the additional effect selecting unit 130 and the additional effect application control unit 140. Of course, all information on a plurality of improved capability points selected for one player may be received to display the information on the game screen.

Thereafter, the additional effect applying unit 150 transmits the information on the game character and the information on the selected improved capability point to a character database 300 in a game server to control the character database 300 to add the improved capability point to the capability point of the game character.

Figure 7:
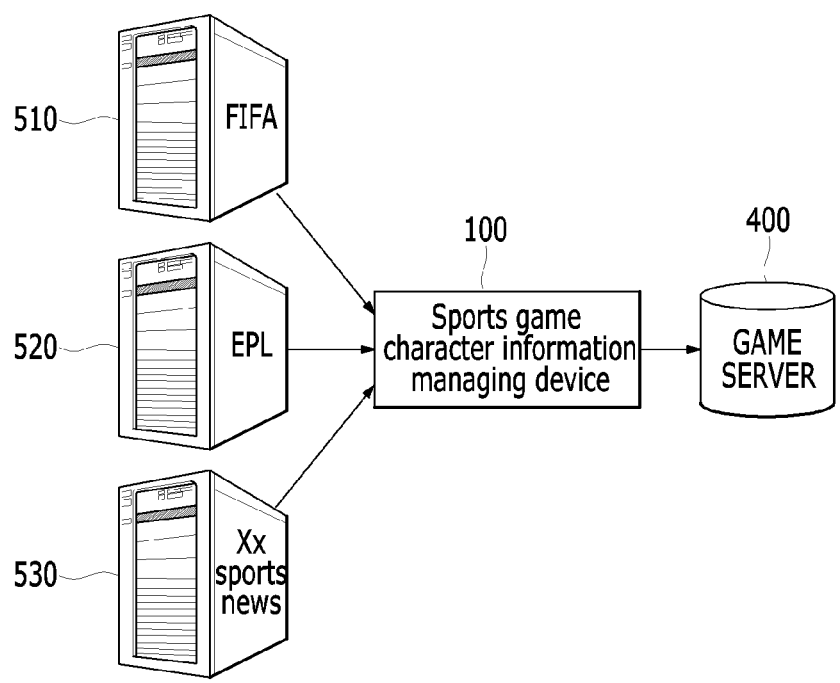
FIG. 7 is a block diagram of a character information managing system of a sports game according to an exemplary embodiment of the present invention.

FIG. 7 is a block diagram of a character information managing system of a sports game according to an exemplary embodiment of the present invention. In the following description, a repeated description with the description of FIGS. 1 to 6 will be omitted. Further, in FIG. 7, a soccer on-line game is described as an example but the sports game is not limited thereto.

Referring to FIG. 7, a sports game character information managing system according to an exemplary embodiment of the present invention includes a sports game character information managing device 100 and a game server 400.

The sports game character information managing device 100 is connected to a server 510 of the FIFA which is the international football association, a server 520 of a professional football league, and a server 300 of a related media source in order to perform the function of the components mentioned with reference to FIG. 6.

That is, the sports game character information managing device 100 accesses the servers 510, 520, and 530 of the sports game related organization and media to receive event information. Thereafter, the event information is analyzed to select a game character whose capability point will be improved and an improved capability point which is added to the capability point of the game character and a duration time of the improved capability point are selected to be returned to the game server 400.

The game server 400 receives the game character, the improved capability point, and the duration time of the improved capability point from the sports game character information managing device 100 and then adds the received improved capability point to capability point data of the game character.

The game server 400 may also display information on the game character whose capability point is improved and information on the improved capability point, that is, the improved amount and the duration time thereof on the game screen in order to notify the users that the capability point of the game character is improved. As a method of displaying the information, as mentioned with reference to FIG. 1, a list of game characters whose capability points are improved and an amount of improved capability, and a duration time are collectively displayed on an initial access screen or a game character whose capability point is improved is displayed so as to be distinguished from another character on a game playing screen.

Figure 8:
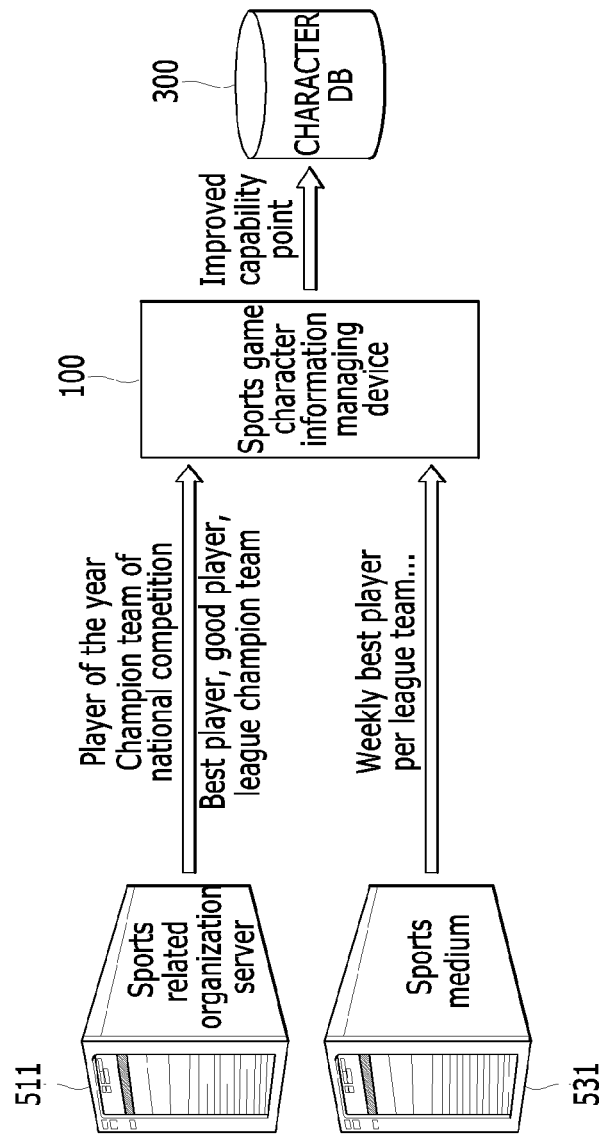
FIG. 8 illustrates an example of data flow according to an exemplary embodiment of the present invention.

FIG. 8 illustrates an example of data flow according to an exemplary embodiment of the present invention. In the following description, a repeated description with the description of FIG. 7 will be omitted.

Referring to FIG. 8, all information which is collected by a sports related organization such as information on a player of the year, a champion team of the national competition, a best player of the year, a good player, a champion team of a professional league which is held by a related organization, a best scorer, and a best assist player, is transmitted from the sports related organization server 511 to the sport game character information managing device 100. Other than the information displayed in FIG. 8, all information to which the improved capability point is applied may be transmitted.

Information on a weekly best player per professional league or a team may be transmitted from the server 531 of the sports medium to the sports game character information managing device 100.

It is obvious that the types of event information which is transmitted from the sports related organization server 511 and the server 531 of the sports medium, which are illustrated in FIG. 8, to the sports game character information managing device 100 may be exchanged The data which is transmitted from the sports game character information managing device 100 to the character database 300 of the game server may be the improved capability point. The transmitted improved capability point information includes information on a game character to which the improved capability point is assigned, an improved amount of the improved capability point, and the duration time.

FIG. 9 illustrates an example of an improved capability point table in order to implement an exemplary embodiment of the present invention.

Referring to FIG. 9, an improved capability point table 600 is illustrated and improved capability points which are diversely added depending on the type of event information are illustrated in the improved capability point table 600.

First, information 610 on the type of event information is illustrated. Here, a list of the type of event information is arranged and includes event information or all information on the type of event information. That is, whether the event is for an individual player or a team may be also distinguished through the information 610 on the type of event information.

As information 620 on the duration time, information on the duration time when the additional effect of the improved capability point is applied depending on the event information is illustrated. In the example of FIG. 9, a duration time of an event which is selected by the FIFA is three months, a duration time of an event which is selected by a professional league managing organization is one month, and a duration time of an event of selecting a weekly best player by the medium is one week. It is obvious that the setting of the duration time may be varied even when the event is selected by the same organization.

Which improved capability point is set depending on the event is stored in the information 630 on the improved capability point. Only an effect which improves the entire capability point is illustrated in the information 630 on the improved capability point of FIG. 9 but an effect which improves only a part of the entire capability point depending on the characteristic of the game or the characteristic of the event may be included.

Information 640 on the order of priority is used to select an improved capability point which is added in an actual game when the type of improved capability points which is selected for a plurality of game characters included for one player exceeds one. An improved capability point having an order of priority which is close to the first position, that is, the higher improved capability point is selected to be added to the capability point of the game character.

The order of priority is determined using the information 620 on the duration time and the information 630 on the improved amount of the improved capability point.

The improved capability point table 600 of FIG. 9 may be diversely set depending on the type of game and the service.

Figure 10:
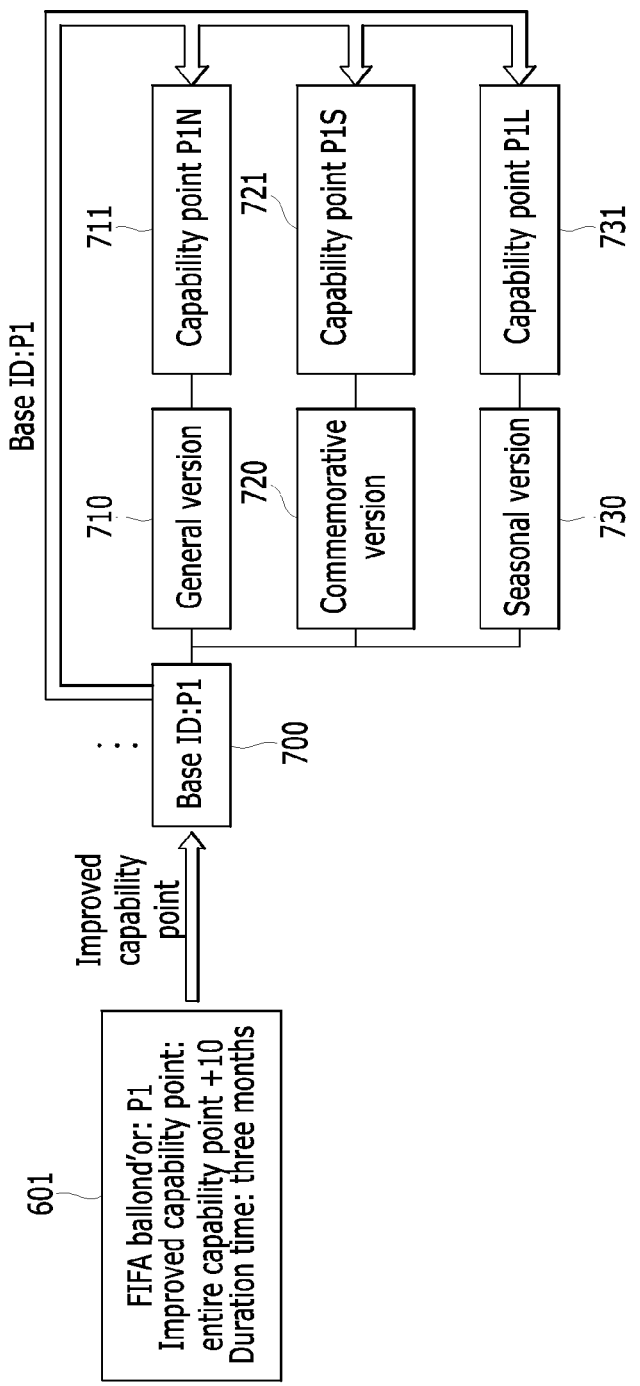
FIG. 10 illustrates an example in which an improved capability point is applied according to an exemplary embodiment of the present invention.

FIG. 10 illustrates an example in which an improved capability point is applied according to an exemplary embodiment of the present invention. Each block of FIG. 10 is visualized for helping the description and each block may be a unit of information including predetermined data.

Referring to FIG. 10, in accordance with the event information, information 610 on a character to which the improved capability point is applied and the improved capability point to be added is set. The information is transmitted to the character database of the game server and the character database searches a base ID 700 which matches the identification information P1 of a player which is included in the information 601.

A plurality of sub characters 710, 720, and 730 may be present in the searched base ID 700. For example, there are a character 710 of a general version which is generally present on the game, a commemorative version character 720 which commemorates a player corresponding to the base ID 700 of a game character to participate in a specific competition, and a seasonal version character 730 which commemorates a player corresponding to the base ID 700 to play an active part in a specific season of a specific professional league. The commemorative version and seasonal version characters 720 and 730 may have a higher capability point than that of the general version character 710 depending on the characteristic of the characters.

Each of the sub characters 710, 720, and 730 includes data 711, 721, and 731 for the capability point. As mentioned above, the capability point of the game character may vary depending on the version.

When the base ID 700 is searched, the improved capability point is added to the capability point data 711, 721, and 731 of the sub characters 710, 720, and 730 so that capability points of all characters corresponding to the base ID 700 may be improved.

Figure 11:
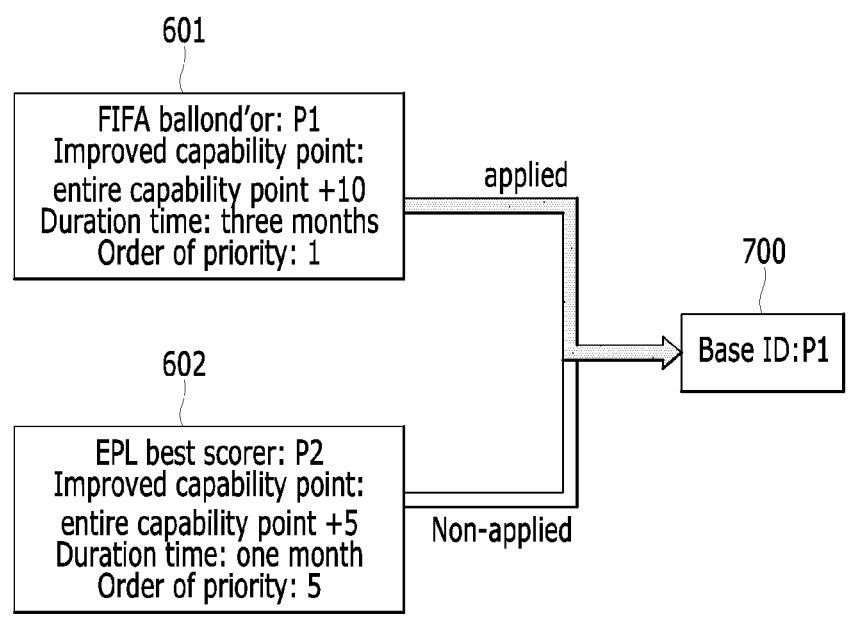
FIG. 11 illustrates an example implemented when a plurality of improved capability points is provided according to an exemplary embodiment of the present invention.

FIG. 11 illustrates an example implemented when a plurality of improved capability points is provided according to an exemplary embodiment of the present invention.

Referring to FIG. 11, information 601 on the character to which the improved capability point is applied and information 602 on the improved capability point to be added is provided. Further, it is confirmed that the identification information of the player in the information 601 and 602 is the same as P1.

In this case, when the information 601 and 602 is received, the orders of priority included in the information 601 and 602 are compared. In an example of FIG. 11, as an effect which is assigned to a game character of a player P1 which is selected as FIFA Ballond'or, predetermined information 601 is provided to maintain an effect which increases the entire capability point by 10 for three months. Further, as an effect which is assigned to a game character of a player P1 which is selected as a best scorer of one season of the English premier league, predetermined information 602 is provided to maintain an effect which increases the entire capability point by 5 for one month.

In this case, the order of priority included in the information 601 is one and the order of priority included in the information 602 is 5, which is understood by comparing the improved amount of the improved capability point and the duration time.

In this case, only the information 601 having a higher order of priority between the information 601 and 602 is transmitted to the base ID 700 of the character database or both information 601 and 602 may be transmitted to be displayed on the game screen. However, information which is substantially applied may be information 601 whose order of priority is 1.

However, when the additional effect of the improved capability point included in the information 601 whose order of priority is 1 ends due to the expiration of the duration time but the additional effect of the improved capability point included in the information 602 whose order of priority is 6 does not end, the improved capability point included in the information 602 whose order of priority is 6 is transmitted to the base ID 700 from that time.

Figure 12:
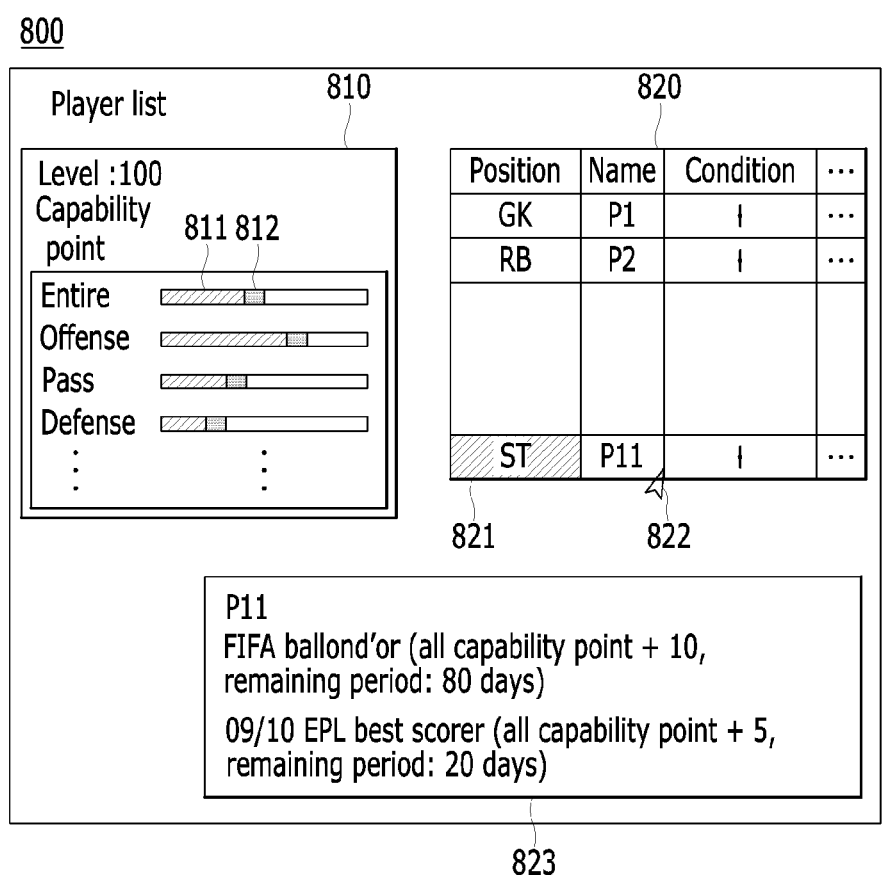
FIG. 12 illustrates an example of a screen when a game is played according to an exemplary embodiment of the present invention.

FIG. 12 illustrates an example of a screen when a game is played according to an exemplary embodiment of the present invention.

FIG. 12 illustrates an example of a screen 800 on which a plurality of game characters is displayed as a list among game playing screens. For example, as mentioned with reference to FIG. 1, the screen 800 includes a screen for managing the team in the sports on-line game, a screen for moving the team, a screen for comparing tactic information in accordance with the sports game, a screen of character cards of the players, and a screen regarding a player transferring market.

On the screen 800, a list 820 of players is displayed. When the improved capability point is assigned to the player P11, a mark 821 is added to the player P11 to distinguish from another player. By doing this, the users may check which player gets the additional effect of the improved capability point.

When a mouse curser 822 is disposed on the list of the player, information 823 on all improved capability point effects which are assigned to the player P11 is displayed. As mentioned in FIG. 11, even when the number of improved capability points which are added to be displayed on the game screen is two or larger, all the information may be transmitted to the game server (that is, character database in the game server).

When the player is clicked, a screen 810 on the capability point of the player is displayed. Details of the capability point of the player may be checked through the screen 810. In order to confirm the user that how much the capability point of the game character is improved through the game screen, a bar 812 of the capability point to be improved is connected to a bar 811 indicating a basic capability point. By doing this, the users may check that the capability point of the game character corresponding to the player is improved again.

Figure 13:
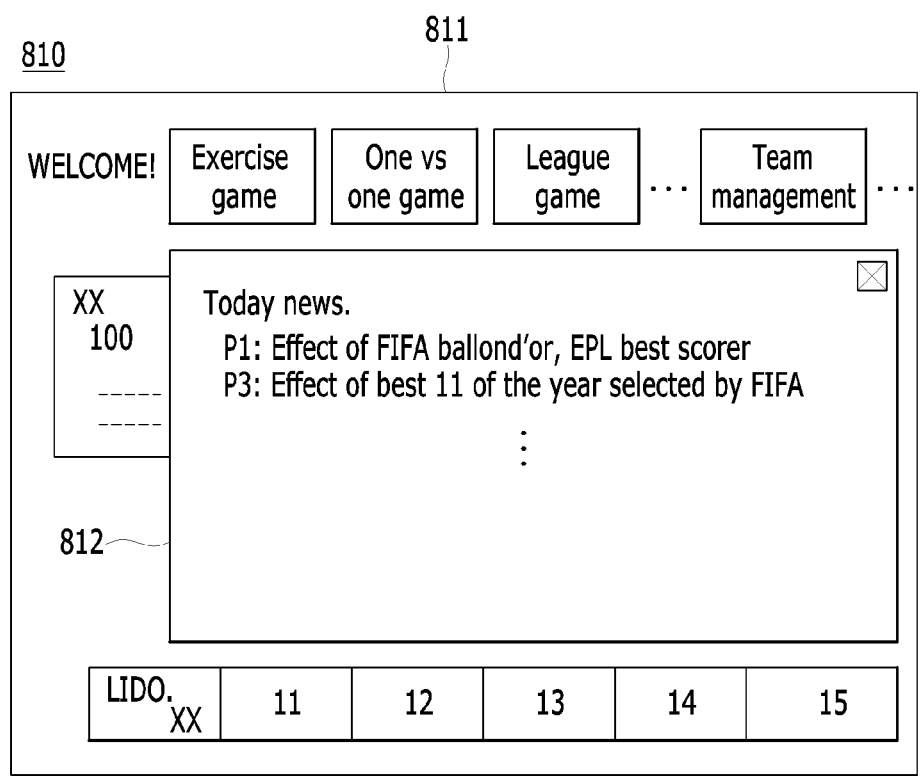
FIG. 13 illustrates an example of a game access screen according to an exemplary embodiment of the present invention.

FIG. 13 illustrates an example of a game access screen according to an exemplary embodiment of the present invention.

Referring to FIG. 13, an initial access screen 830 of the game is illustrated. The initial access screen 830 includes a basic initial access screen 831 and a notice screen 832. On the basic initial access screen 831, various menus through which all functions of the game are selected and basic information of the user may be displayed.

On the notice screen 832, information on an improved capability point addition effect which is generated from today or before a predetermined period (for example, at least three days) may be displayed. Referring to the notice screen 832 of FIG. 13, news saying that the player P1 is awarded the FIFA Ballond'or, that is, an award of the player of the year and also selected as a best scorer of the EPL, that is, the England Premier League so that the effect is generated is displayed. As mentioned with reference to FIGS. 1 to 12, only the effect of the award of the FIFA Ballond'or having a higher order of priority is applied to the capability point of the game character corresponding to the player P1.

Further, it is confirmed that a player P3 is selected as one of the best 11 players of the year selected by the FIFA and the effect thereof is generated.

Figure 14:
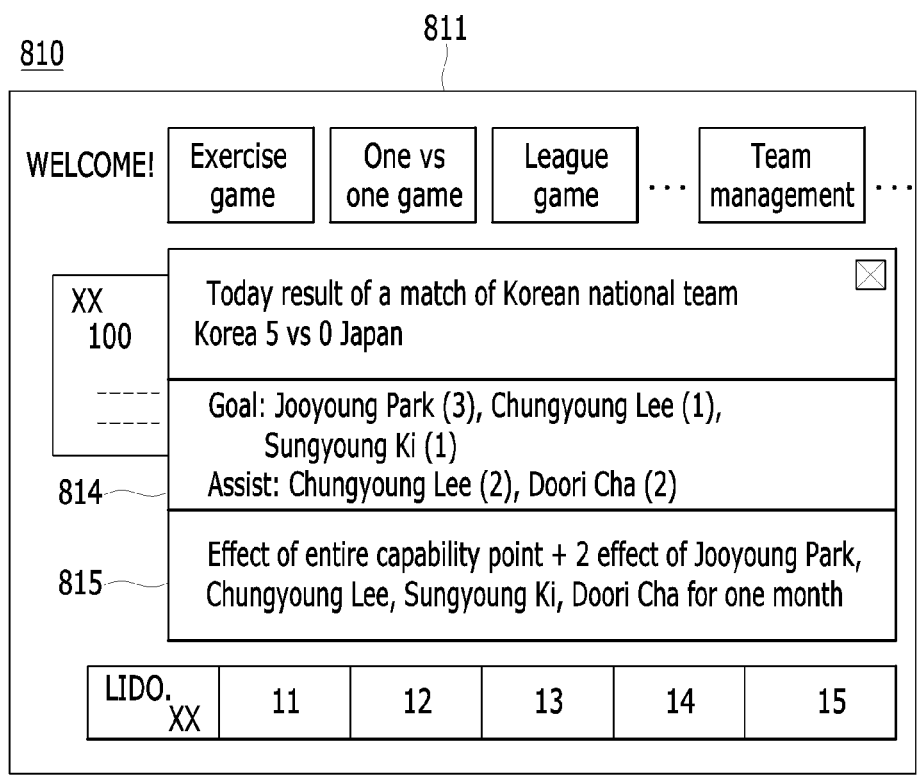
FIG. 14 illustrates another example of a game access screen according to an exemplary embodiment of the present invention.

FIG. 14 illustrates another example of a game access screen according to an exemplary embodiment of the present invention.

Referring to FIG. 14, as a different example from the notice screen 832 of FIG. 13, when the nationality of the user is Korean or the country where the game is played is Korea, a game result of the Korean national soccer team is illustrated.

First, a screen 833 which displays a result of the national completion of the Korean national soccer team is checked. Further, a screen 834 for the players which record a goal or an assist is displayed in the result so that it may be confirmed which player plays an active part in the game.

Finally, a screen 835 which displays the improved capability points for the game characters corresponding to the players displayed on the screen 834 is illustrated. By doing this, the user may enjoy the game with more fun while directly checking the improved capability point through the game for a game which is played by the national team in its own country.

As illustrated in FIGS. 12 to 14, the user may check which event includes an actual sports player corresponding to the game character which is held by the user. Further, the user may check which capability improvement effect is applied to the game character which is included in the event and held by the user.

By doing this, the users may have a feeling as if the users play the actual sports game while playing the game and talk to various users to be interested in an actual sport game so that immersion in the on-line game is increased.

As described above, even though it is described that all constituent elements of the exemplary embodiment of the present invention are combined as one or combined to be operated, the present invention is not limited to the exemplary embodiment. That is, within the scope of purpose of the present invention, one or more constituent elements may be selectively combined to be operated.

Further, all the constituent elements may be implemented as one independent hardware but a part or all of the constituent elements are selectively combined to be implemented as a computer program including a program module which performs a part or all function which is combined in one or a plurality of hardware. In addition, codes and code segments which configure the computer program may be easily deducted by those skilled in the art.

Such a computer program is stored in a computer readable medium to be read and executed by the computer to implement the exemplary embodiment of the present invention. A storage medium of the computer program may include a magnetic recording medium, an optical recording medium, and a carrier wave medium.

Further, unless explicitly described to the contrary, the word "comprise", "configure" and "have" will be understood to imply the inclusion of stated elements but not the exclusion of any other elements. Unless differently defined, all terminologies including a technical or scientific terminology may have the same meaning which is generally understood by those skilled in the art. Terminologies defined in generally used dictionary shall be construed that they have meanings matching those in the context of a related art, and shall not be construed in ideal or excessively formal meanings unless they are clearly defined in the present application.

The invention claimed is:

1. An on-line sports game character information managing method, comprising:
   receiving, in real-time over a network, by a managing device, an event information on at least one of a team and a player included in the on-line game from at least one of a server of an organization and a server of a medium related with a sports game corresponding to the on-line game;
   selecting, by the managing device, at least one player related with the event information;
   selecting, by the managing device, a game character stored in a character database of a game server that matches an identification information of the at least one player;
   setting, by the managing device, an improved capability point that is added to a capability point of the game character in accordance with the event information;
   setting, by the managing device, a duration time of the improved capability point to be applied to the capability point of the game character based on a type of the event information, wherein different duration times for the improved capability point are set depending on the type of the event information; and
   adding, by the game server, the improved capability point to the capability point of the game character for the set duration time while a user is playing the on-line game, wherein the improved capability point is no longer added to the capability point of the game character when the set duration time expires.

2. The method of claim 1, wherein the setting of an improved capability point comprises setting the improved capability point to a larger improved amount when the event information regards an individual player than when the event information regards a team of the at least one player.

3. The method of claim 1, wherein the event information comprises when a game of a national team is played for the sports game by which the on-line game is played, at least one of a result of the game and information indicating what happens to players of the national team in the game.

4. The method of claim 1, wherein the adding of the improved capability point comprises when more than one improved capability point is to be added for a specific player, adding only one improved capability point having a higher order of priority based on at least one of the set duration time of the improved capability point and an improved amount of the improved capability point.

5. The method of claim 4, further comprising adding another improved capability point of the more than one capability point having a duration time that has not yet expired.

6. The method of claim 1, further comprising:
   after the adding of the improved capability point, displaying a message indicating that the improved capability point is assigned to the game character on an on-line game screen.

7. The method of claim 6, wherein the displaying of a message comprises when the user accesses the on-line game, displaying a notice information indicating that the improved capability point starts to be assigned to the game character and outputting the notice information for a predetermined period from a time when the improved capability point is assigned.

8. The method of claim 6, wherein the displaying of a message comprises displaying the game character to which the improved capability point is assigned to be distinguished from another game character on a screen through which a plurality of game characters is displayed.

9. An on-line sports game character information managing device, comprising:
   a processor; and
   a computer readable medium storing code that, when executed by the processor, causes the processor to:
   receive, in real-time over a network, an event information on at least one of a team and a player included in an on-line game from at least one of a server of an organization and a server of a medium related with a sports game corresponding to the on-line game;
   select a game character that matches an identification information of a player related with the event information;
   set an improved capability point that is added to a capability point of the game character in accordance with the event information;
   set a duration time of the improved capability point to be applied to the capability point of the game character based on a type of the event information, wherein different duration times for the improved capability point are set depending on the type of the event information; and
   control a game server to add the improved capability point to the capability point of the game character for the set duration time while a user is playing the on-line game,
   wherein the improved capability point is no longer added to the capability point of the game character when the set duration time expires.

10. The device of claim 9, wherein the computer readable medium further comprises code that, when executed by the processor, causes the processor to:
   when more than one improved capability point is to be added for a specific player, control the game server to add only one improved capability point having a higher order of priority based on at least one of the set duration time of the improved capability point and an improved amount of the improved capability point.

11. The device of claim 9, wherein the computer readable medium further comprises code that, when executed by the processor, causes the processor to:

set the improved capability point to a larger improved amount when the event information regards an individual player than when the event information regards a team of the player.

12. The device of claim 10, wherein the computer readable medium further comprises code that, when executed by the processor, causes the processor to:
control the game server to add another improved capability point of the more than one capability point having a duration time that has not yet expired to the capability point of the game character when the set duration time of the improved capability point having a higher order of priority has expired.

13. An on-line sports game character information managing system, comprising:
a sports game character information managing device that receives in real-time over a network an event information on at least one of a team and a player included in an on-line game from at least one of a server of an organization and a server of a medium related with a sports game corresponding to the on-line game, selects a game character that matches an identification information of a player related with the event information, sets an improved capability point that is added to a capability point of the game character in accordance with the event information, sets a duration time of the improved capability point to be applied to the capability point of the game character based on a type of the event information, wherein different duration times for the improved capability point are set depending on the type of the event information, and transmits a signal to a game server to add the set improved capability point to the capability point of the game character; and
the game server that receives the signal transmitted from the sports game character information managing device and adds the improved capability point to the capability point of the game character for the set duration time while a user is playing the on-line game,
wherein the improved capability point is no longer added to the capability point of the game character when the set duration time expires.

14. The system of claim 13, wherein the sports game character information managing device, when more than one improved capability point is to be added for a specific player, controls the game server to add only one improved capability point having a higher order of priority based on at least one of the set duration time of the improved capability point and an improved amount of the improved capability point.

15. The system of claim 13, wherein the sports game character information managing device sets the improved capability point to a larger improved amount when the event information regards an individual player than when the event information regards a team of the player.

16. The system of claim 13, wherein the game server when the user accesses the on-line game, displays a notice information indicating that the improved capability point starts to be assigned to the game character on an access screen of the on-line game and outputs the notice information for a predetermined period from a time when the improved capability point is assigned.

17. The system of claim 13, wherein the game server displays the game character to which the improved capability point is assigned to be distinguished from another game character on a screen through which a plurality of game characters is displayed.

18. A non-transitory computer readable medium storing executable code for managing sports game character information that, when executed by at least one computer, causes the at least one computer to:
receive, in real-time over a network, an event information on at least one of a team and a player included in an on-line game from at least one of a server of an organization and a server of a medium related with a sports game corresponding to the on-line game;
select at least one player related with the event information;
select a game character that matches an identification information of the player stored in a character database of a game server;
set an improved capability point that is added to a capability point of the game character in accordance with the event information;
set a duration time of the improved capability point to be applied to the capability point of the game character based on a type of the event information,
wherein different duration times for the improved capability point are set depending on the type of the event information; and
add the improved capability point to the capability point of the game character for the set duration time while a user is playing the on-line game, wherein the improved capability point is no longer added to the capability point of the game character when the set duration time expires.

* * * * *